United States Patent
Osato

[11] Patent Number: 5,503,924
[45] Date of Patent: Apr. 2, 1996

[54] EXCHANGE-COUPLED MAGNETOOPTICAL RECORDING MEDIUM WITH FIRST LAYER HAVING SMALLER VERTICAL ORIENTATION SATURATION MAGNETIZATION THAN IN-PLANE ORIENTATION SATURATION MAGNETIZATION OF SECOND LAYER

[75] Inventor: Yoichi Osato, Yokohama, Japan

[73] Assignee: Canon Kabushiki Kaisha, Tokyo, Japan

[21] Appl. No.: 277,134

[22] Filed: Jul. 19, 1994

Related U.S. Application Data

[63] Continuation of Ser. No. 824,731, Jan. 21, 1992, abandoned, which is a continuation of Ser. No. 448,895, Dec. 12, 1989, abandoned.

[30] Foreign Application Priority Data

Dec. 13, 1988 [JP] Japan .................. 63-313021

[51] Int. Cl.$^6$ .................. B32B 5/16; G11B 5/66
[52] U.S. Cl. .................. 428/336; 428/694 MM; 428/694 LE; 428/611; 428/615; 428/655; 428/656; 360/131; 365/122; 369/13
[58] Field of Search .................. 428/694 MM, 428/694 EC, 694 SC, 694 LE, 900, 611, 615, 655, 656, 332, 336; 360/131, 135; 365/122; 369/13, 14; 430/945

[56] References Cited

U.S. PATENT DOCUMENTS 4,727,005  2/1988  Sato .................. 428/693

FOREIGN PATENT DOCUMENTS 258978  3/1988  European Pat. Off. .

*Primary Examiner*—Paul J. Thibodeau
*Assistant Examiner*—R. Follett
*Attorney, Agent, or Firm*—Fitzpatrick, Cella, Harper & Scinto

[57] ABSTRACT

An overwritable magneto-optical recording medium is disclosed. The recording medium comprises a first magnetic layer exhibiting vertical magnetic anisotropy and a second magnetic layer having a higher Curie temperature and a lower coercive force at room temperature in comparison with the first magnetic layer and exchange coupled with the first magnetic layer, wherein the second magnetic layer exhibits in-plane magnetic anisotropy and vertical magnetic anisotropy at room temperature and the vertical magnetic anisotropy relative to the in-plane magnetic anisotropy becomes larger in the vicinity of the Curie temperature of the first magnetic layer than at room temperature.

Further, a recording method using the magneto-optical recording medium is also disclosed.

17 Claims, 4 Drawing Sheets

EXCHANGE-COUPLED MAGNETOOPTICAL RECORDING MEDIUM WITH FIRST LAYER HAVING SMALLER VERTICAL ORIENTATION SATURATION MAGNETIZATION THAN IN-PLANE ORIENTATION SATURATION MAGNETIZATION OF SECOND LAYER

This application is a continuation of application Ser. No. 07/824,731 filed Jan. 21, 1992, now abandoned, which is a continuation of application Ser. No. 07/448,895, filed Dec. 12, 1989, also now abandoned.

BACKGROUND OF THE INVENTION

1. Field of the Invention

The present invention relates to a magneto-optical recording medium having a two-layer magnetic film recording layer for recording information by radiation of light beam. The present invention also relates to a recording method using the same.

2. Related Background Art

Research and development of an optical memory element which uses a laser beam to realize a high density and large capacity memory have been accomplished rapidly. Magneto-optical recording media is one of the favored medium used as rewritable optical memory elements.

Of course, when information recorded on such a magneto optical recording medium is to be re-written, the information should be erased and then new information should be recorded. However, overwriting of information in magneto-optical media cannot be attained. For example, when information on a predetermined track on a magnetooptical disk is to be rewritten, the information on the track must first be erased in one revolution of the disk and then new information is written in the next revolution. As a result, the re-recording speed is low.

In order to solve the above-mentioned problem, separate record/reproduce and erase heads can be provided, or information can be recorded while a magnetic field applied while a continuous laser beam is modulated. However, such an apparatus is of large scale and high cost, and may also not attain high speed modulation.

On the other hand, the present inventors already proposed in European Patent Application Publication No. 258,978 (corresponding to copending U.S. patent application Ser. No. 475,941, filed Jan. 30, 1990), an overwritable magnetooptical recording medium which is not associated with the above-mentioned drawbacks of the prior art and a recording method using the same. Such medium is provided with a first vertical magnetic layer and a second vertical magnetic layer of a higher Curie temperature and a lower coercive force than those of the first vertical magnetic layer, which are laminated in succession and are mutually exchange coupled. The application also describes a structure including a regulation layer provided between the first and second vertical magnetic layers serving to regulate the exchange force therebetween. The regulation layer comprises a magnetic film exhibiting in-plane magnetic anisotropy at room temperature and vertical magnetic anisotropy at an elevated temperature.

SUMMARY OF THE INVENTION

The object of the present invention is to provide a magneto-optical recording medium which is an improvement over the conventional overwritable medium explained above. The present invention is thus a recording medium which is capable of stably storing information with a simpler structure, and it is also a recording method using the same.

The above objects can be attained, according to the present invention, by a magneto-optical recording medium comprising:

a first magnetic layer exhibiting vertical magnetic anisotropy; and a second magnetic layer having a higher Curie temperature and a lower coercive force at room temperature, compared with those in said first magnetic layer, and exchange coupled with said first magnetic layer, said second magnetic layer exhibiting in-plane magnetic anisotropy and vertical magnetic anisotropy at room temperature, said vertical magnetic anisotropy relative to the in-plane magnetic anisotropy becoming larger in the vicinity of the Curie temperature of the first magnetic layer than at room temperature.

The recording method using the above-mentioned recording medium consists of following steps of:

(a) applying a magnetic field sufficient for orienting the vertical magnetization of said second magnetic layer in a predetermined direction but not sufficient for inverting the magnetization of said first magnetic layer; and (b) irradiating the medium with a light beam of a power sufficient for heating the medium close to the Curie temperature of the first magnetic layer under the application of a vertical magnetic field, thereby selectively effecting, according to information signal, either a first record in which the first magnetic layer is magnetized in a stable direction with respect to the second magnetic layer while the magnetization thereof is not changed, or a second record in which the magnetization of the second magnetic layer is inverted by the irradiation with a light beam of a power sufficient for heating the medium close to the Curie temperature of the second magnetic layer and then the first magnetic layer is magnetized in a stable direction with respect to the second magnetic layer.

DETAILED DESCRIPTION OF THE PREFERRED EMBODIMENTS

Figure 1A:
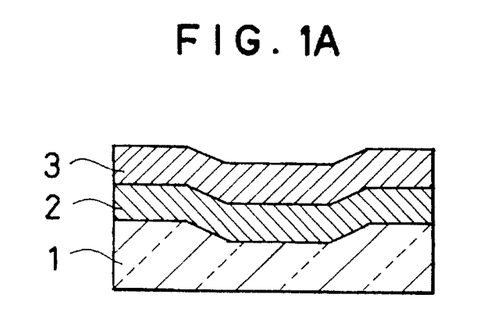
FIGS. 1A and 1B are schematic cross-sectional views of one example of the structures of the magneto-optical recording medium of the present invention.

FIG. 1A is a schematic cross-sectional view of an embodiment of the magneto-optical recording medium of the present invention, which comprises, on a pre-grooved transparent substrate 1, a first magnetic layer 2 and a second magnetic layer 3 laminated in succession.

Figure 2:
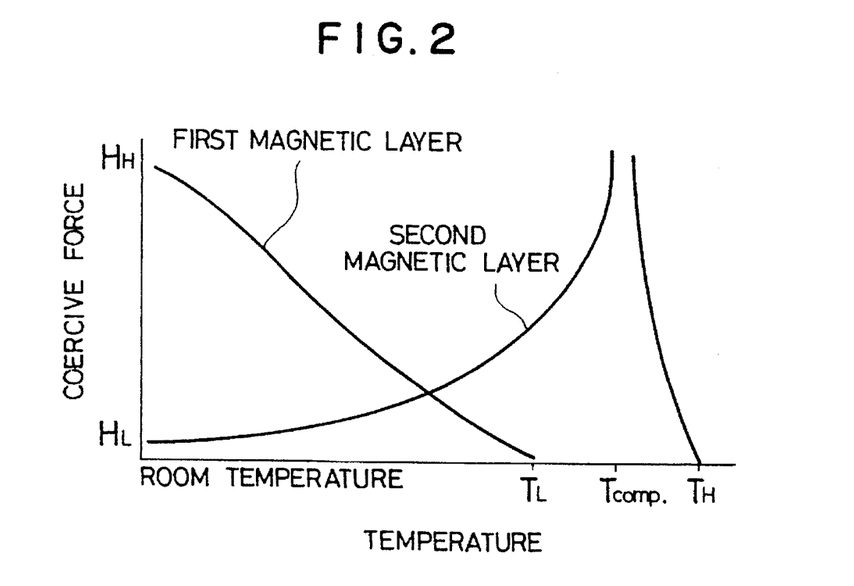
FIG. 2 is a chart showing an example of temperature characteristics of coercive force in the recording medium of the present invention.

As shown in FIG. 2, the first magnetic layer 2 has a lower Curie temperature ($T_L$) and a higher coercive force ($H_H$) at room-temperature, while the second magnetic layer 3 has a higher Curie temperature ($T_H$) and a lower coercive force ($H_L$) at room-temperature. The terms "higher" or "lower" are relative and defined herein by comparing both magnetic layers. The Curie temperature $T_L$ of the first magnetic layer is selected generally in a range of 70°–250° C., preferably 90°–200° C., while the coercive force $H_H$ thereof is selected generally in a range of 3–20 kOe, preferably 7–20 kOe. The Curie temperature $T_H$ of the second magnetic layer is selected generally in a range of 100°–400° C., preferably 150°–300° C., while the coercive force $H_L$ thereof is selected generally not exceeding 1000 Oe, preferably not exceeding 500 Oe.

The first magnetic layer 2 also has vertical magnetic anisotropy. That is to say, the easy direction of magnetization of the first magnetic layer 2 is perpendicular to the plane of the substrate 1, which property remains the same both at room temperature or when heated by laser beam irradiation.

On the other hand, the easy direction of magnetization of the second magnetic layer 3 at room temperature has a component which is not perpendicular to the plane of the substrate. That is to say, at room temperature the second magnetic layer has vertical magnetic anisotropy and in-plane magnetic anisotropy. As used herein, "room temperature" means the temperature of ordinary use of the magneto-optical recording medium, and more specifically a general temperature range of about −10° to 70° C. Additionally, "having in-plane magnetic anisotropy" means the presence of in-plane magnetic anisotropy sufficient for reducing the magnetic exchange force between the first and second magnetic layers to a level required for attaining the effect of the present invention as is explained below. The in-plane magnetic anisotropy of the second magnetic layer at room temperature can be selected that the magnetization is saturated with an applied magnetic field in the plane dfrection less than 7 kOe, preferably less than 3 kOe. Additionally, the vertical magnetic anisotropy of the second magnetic layer at room temperature can be selected that the magnetization is saturated with a vertically applied magnetic field larger than 500 Oe, preferably larger than 2 kOe. The in-plane magnetic anisotropy of the second magnetic layer when the medium is heated close to $T_L$ is preferably such that the magnetization is not saturated with an in-plane direction applied recording bias magnetic field (about 100–500 Oe,) but is saturated by the vertically applied field.

The second magnetic layer 3 has a compensation point ($T_{comp}$) between room temperature and the temperature $T_H$ preferably in a range of 50°–200° C.

The first and second magnetic layers 2, 3 with the above characteristics can be composed principally of a component with magneto-optical effect, particularly an amorphous magnetic alloy of a rare earth element and a transition metal, such as GdCo, GdFe, TbFe, DyFe, GdTbFe, TbDyFe, GdDyFe, GdTbFeCo, TbFeCo, GdTbCo, GdDyFeCo or HoGdFeCo. If both layers are formed by amorphous magnetic alloys of rare earth element and transition metal, the first magnetic layer 2 is preferably formed such that the sublattice magnetization is larger in the transition metal, whereas the second magnetic layer 3 is preferably formed such that the sublattice magnetization is larger in the rare earth element. This can be achieved by selecting the proportion of the rare earth element in the magnetic layer in a range of 0.2 to 0.5, as represented by the ratio of the number of the atoms, i.e., (rare earth element)/(rare earth element+ transition metal). The second magnetic layer with the characteristic desired can be obtained by selecting the composition in a transition area between an area of vertical magnetic layer and an area of in-plane magnetic layer. The second magnetic layer may also be composed of a multi-layer film (periodic structured film) obtained by repeatedly laminating a thin layer of rare earth element and a thin layer of transition metal.

The first and second magnetic layers are so positioned as to be capable of exchange coupling at least when heated (preferably close to the temperature $T_L$), because the recording method of the present invention utilizes the exchange coupling force at the heated state as is explained below. Consequently the recording medium is not limited to the structure shown in FIG. 1 (in which both layers are directly laminated) but includes any structure enabling sufficient exchange coupling for recording, such as that including an intermediate layer between both layers. The thickness of the first magnetic layer is generally in a range of 100–1000 Å, preferably 200–500 Å, while that of the second magnetic layer is generally in a range of 300–3000 Å, preferably 500–1500 Å.

Figure 1B:
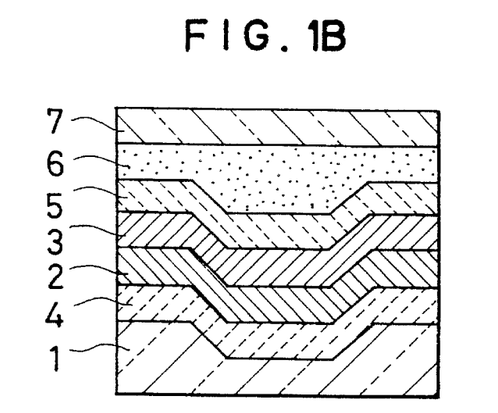

FIG. 1B is a schematic cross-sectional view of another embodiment of the magneto-optical recording medium of the present invention, in which protective films 4, 5 improve the durability of the magnetic layers 2, 3 and wherein substrate 7 to substrate 1 is adhered by adhesive layer 6. Further, it is possible to effect recording and reproduction upon a recording medium produced by laminating the layers 2–5 on the substrate 7 and adhering the thus constructed substrate 7.

Figure 3:
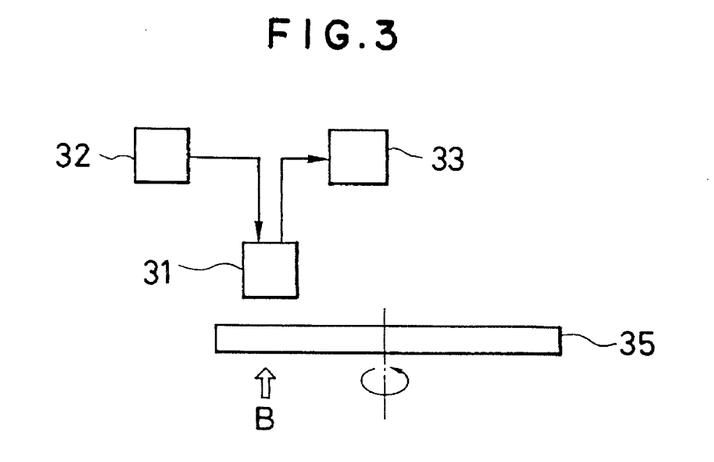
FIG. 3 is a schematic view of an example of a magneto-optical record/reproducing apparatus for recording on the medium of the present invention.
Figure 4:
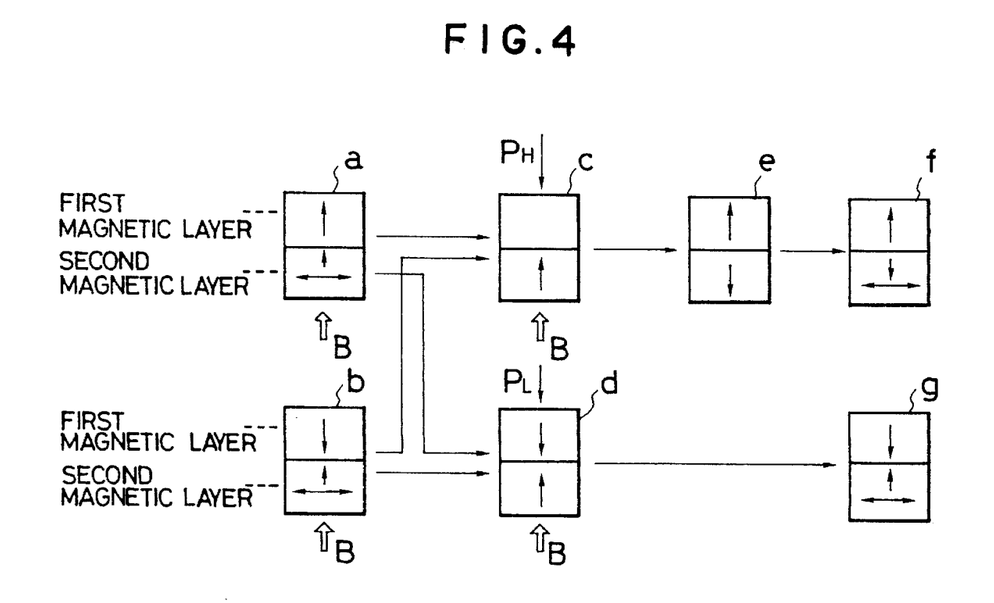
FIG. 4 is a schematic view showing an embodiment of the recording method of the present invention.

Now reference is made to FIGS. 2 to 4 for explaining an embodiment of the recording method of the present invention. In the present invention, the stable directions of magnetization of the magnetic layers when they are strongly exchange coupled (namely, when they are heated) may be mutually parallel or antiparallel (i.e., respectively, the same or opposite directions). However, in the following description, it is assumed that said the stable directions of magnetization are antiparallel.

FIG. 3 schematically shows a magneto-optical record/ reproducing apparatus which is capable of exploiting the recording method of the present invention. The record/ reproducing apparatus is provided with a record/reproducing head 31, a recording signal generator 32, and a signal reproducer 33. Head 31 is provided with means for irradiating disk 35 with a laser beam, and means for generating a recording bias magnetic field, which is upward in the present embodiment.

A magneto-optical disk 35 of a structure as shown in FIG. 1B is rotated. During rotation, while an upward recording bias magnetic field B of an "appropriate value" (as explained below) is applied in the vicinity of the record/reproducing head 31, disk 35 is irradiated by a laser beam of two power levels (first and second) by record/reproducing head 31 according to a signal from the recording signal generator 32. The first laser power $P_L$ heats the disk 35 close to the Curie temperature $T_L$ of the first magnetic layer, while the second laser power $P_H$ is to heat the disk 35 above the compensation point $T_{comp}$ of the second magnetic layer, preferably close to the Curie temperature $T_H$ of the second magnetic layer.

The recording bias magnetic field B is of a level capable of orienting the vertical magnetization of the second magnetic layer in a direction. In the present embodiment, the magnetic field is applied to the disk not only at the irradiating position of the laser beam but in the vicinity thereof, so that the magneto-optical disk 35 assumes a magnetization state as shown in a or b in FIG. 4 at room temperature prior to the irradiation by the laser beam. After recording with the first laser power, a record bit of the magnetization g is formed as shown in FIG. 4, while after recording with the second laser power, there is formed a record bit of the magnetization f in FIG. 4. In this manner, two kinds of bit f, g shown in FIG. 4, from either of the two pre-recording magnetization states a, b can be formed. This indicates that the recording method of the present invention is capable of overwriting without erasure of the preceding record.

Additionally, before conducting the recording explained above, disk 35 may be rotated while the recording bias magnetic field from head 31 is applied, but without irradiation of the recording laser beam, thereby orienting the magnetization of the second magnetic layer by a direction as shown in a or b in FIG. 4.

In the following is explained the recording (first recording) by the first laser power.

The first laser power $P_L$ heats the disk 35 close to $T_L$. As shown in FIG. 2, at a temperature close to $T_L$, the second magnetic layer has a sufficient coercive force, so that the magnetization thereof (upward) is difficult to change. Additionally, at such temperature close to $T_L$, the second magnetic layer reduces in the proportion of the in-plane easy magnetization component as compared to that at room temperature, thus showing strongly vertical magnetic anisotropy, whereby the first and second magnetic layers are strongly exchange coupled. Consequently, when the temperature begins to descend after the irradiation of the laser beam, the first magnetic layer is oriented downwards by the exchange force from the second magnetic layer (effective bias magnetic field from the second magnetic layer), thereby assuming a magnetization state d in FIG. 4 (stable state in terms of the exchange force). When the recording medium is further cooled to room temperature, the second magnetic layer exhibits stronger in-plane magnetic anisotropy, whereby a record bit, shown by g in FIG. 4, is formed. The recording bias magnetic field B applied from the head 31 has to be strong enough for maintaining the magnetization of the second magnetic layer even when heated with the laser beam. That is to say, the first recording cannot be attained if the recording bias magnetic field is too weak.

Now recording (second recording) by the second laser power is explained.

The second laser power $P_H$ heats the disk 35 beyond $T_{comp}$, preferably close to $T_H$. During the course of heating, the magnetization of the second magnetic layer is inverted downwards in the vicinity of $T_{comp}$ because the superiority of rare earth element in the sublattice magnetization is replaced by the transition metal, whereby the direction of magnetization is inverted. When the heating is continued close to $T_H$, the magnetization of the second magnetic layer is changed upwards, as shown in c in FIG. 4, by the recording bias magnetic field B. When the disk 35 is cooled below $T_{comp}$ after the irradiation with the second laser power, the magnetization is again inverted downwards as explained above. When the temperature goes further below $T_L$, the first and second magnetic layers strongly couple magnetically and, because the magnetization of the second magnetic layer is downward at this point, magnetization appears upwardly in the first magnetic layer as shown in e in FIG. 4 by the exchange force. Disk 35 is then further cooled to room temperature and the second magnetic layer exhibits stronger in-plane magnetic anisotropy, thus forming a record bit as shown in f in FIG. 4. In this state, the exchange force between the first and second magnetic layers is weak. Therefore, the magnetization of the first magnetic layer is stably retained without inversion even when the vertical magnetization of the second magnetic layer is oriented upwards as shown in a in FIG. 4 by the application again of the recording bias magnetic field B to the record bit "f".

As apparent from the foregoing explanation, the "appropriate value" of the bias magnetic field applied by the record/reproducing head 31 has to be of a level:

(A) not hindering the orientation of magnetization (downwards in the foregoing example) of the first magnetic layer even while being heated by the first laser power $P_L$;

(B) capable of assisting the inversion of magnetization (from downwards to upwards in the foregoing example) of the second magnetic layer when the recording medium is heated close to $T_H$ by the second laser power $P_H$; and (C) capable of orienting the vertical magnetization (upwards in the foregoing example) of the second magnetic layer without affecting the direction of the magnetization of the first magnetic layer when the recording medium returns to room temperature after the irradiation with the second laser power $P_H$.

Consequently, the bias magnetic field is preferably selected at a minimum level satisfying the above requirements (A), (B) and (C). Specifically, the level meeting requirement (C) is a value exceeding the exchange force acting on the second magnetic layer at the vicinity of room temperature+the coercive force of the second magnetic layer at the vicinity of room temperature, of which the appropriate range is 50 to 500 Oe. Use of a recording bias magnetic field which is smaller than this range may make orienting the second magnetic layer difficult, while use of a magnetic field exceeding the above range may result in increased recording noise.

As used herein "vertical" referring to the magnetization of the vertical direction magnetic layers is not limited to the strictly, but it also covers approximately vertical directions for which recording and reproduction of the magneto-optical recording medium are generally possible.

As explained above, the recording medium of the present invention exhibits stronger exchange force of both layers when heated. Consequently, in the first and second recording explained above, there can be stably attained the orientation (upward or downward) of the first magnetic layer by the exchange force from the second magnetic layer, at a temperature close to $T_L$.

On the other hand, the recording medium of the present invention exhibits a relatively weak exchange force of the two layers at room temperature. Consequently, when the medium is cooled after irradiation with the second laser power, the magnitization of the second magnetic layer can be oriented (upwards against the exchange force from the first magnetic layer) even with a weak bias magnetic field.

The information recorded on the disk 35 in the form of record bits f, g shown in FIG. 4 through the above-explained recording method of the present invention can be reproduced by irradiating the disk 35 with a laser beam of a reproducing power from the head 31, receiving the reflected light, through an analyzer, by a photoelectric converting device, and processing the output thereof with a signal reproducer 33.

The recording medium of the present invention naturally satisfies $$H_H > H_L > \frac{\sigma_w}{2Msh}$$

wherein: Ms: saturation magnetization of second magnetic layer h: thickness of second magnetic layer $\sigma_w$: magnetic wall energy between two layers since recording is attained by bits in which the magnetization of the first magnetic layer is oriented in the stable or unstable direction with respect to the vertical magnetization of the second magnetic layer.

In the following is explained, for the purpose of comparison, the control of exchange force in the conventional magneto-optical recording medium with two vertical magnetic films.

A particularly strong exchange force is obtained when the directions of magnetization of the first and second magnetic layers mutually coincide (when both layers have vertical magnetic anisotropy, or both layers have in-plane magnetic anisotropy). The exchange forces in such cases can be determined as follows:

Exchange force acting on first magnetic layer=$\sigma_w/2Ms_1L_1$

Exchange force acting on second magnetic layer=$\sigma_w/2Ms_2L_2$ wherein $Ms_1$, $Ms_2$ are respectively saturation magnetizations of the first and second magnetic layers; $L_1$, $L_2$ are respectively thicknesses of the first and second magnetic layers; and $\sigma_w$ is the magnetic wall energy appearing when the first and second magnetic layers are in an unstable state.

For example, if the magnetic layers are composed of rare earth-transition metal alloys such as Gd, Tb Dy-Fe, Co, $\sigma_w$ is generally in a range of 2–4 erg/cm$^2$ while Ms is in a range of 50–200 emu/cm$^3$. Consequently there are anticipated exchange forces of the order of 20–0.5 kOe for the thicknesses L of 200–1000 Å.

Empirically, the exchange force is of the order of 500–1000 Oe for a coercive force of about 500 Oe and a film thickness of about 500 Å, if the second magnetic layer is composed of a film of relatively weak exchange force, such as GdFe.

However such exchange force is excessively large even when the second magnetic layer is composed of Gd Fe as mentioned above, since the appropriate range of the bias magnetic field is 50–500 Oe in the recording method of the present invention.

In the conventional recording medium, the exchange force can be reduced by decreasing the value of $\sigma_w$, for example by a non-magnetic intermediate layer inserted between the first and second magnetic layer.

Figure 5:
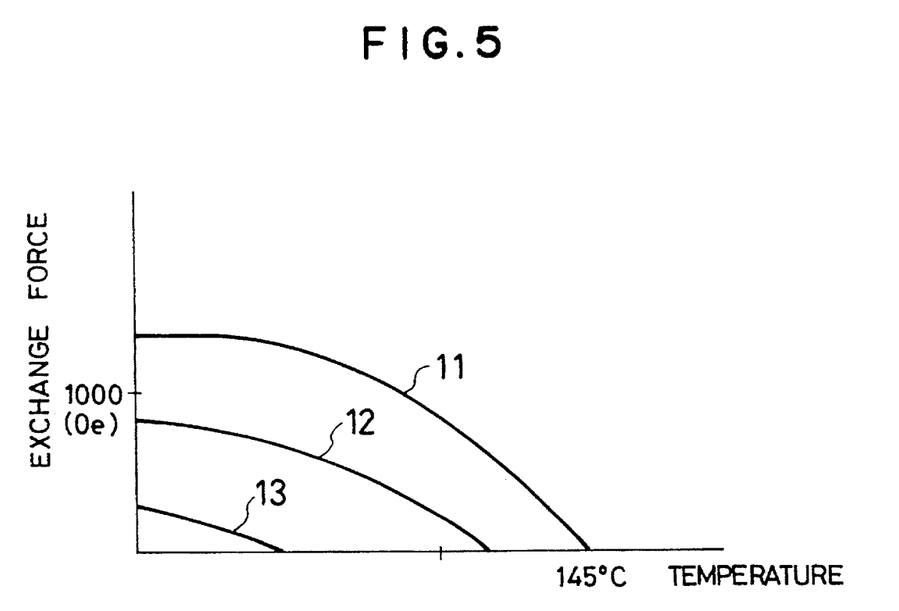
FIG. 5 is a chart showing temperature dependence of the exchange force in a recording medium with laminated vertical magnetic layers.

FIG. 5 shows the temperature-dependent change of the exchange force acting on the second magnetic layer. The first magnetic layer is composed of $Tb_{18}Fe_{78}Co_4$ of a thickness of 400 Å, while the second magnetic layer is composed of $Gd_{22}Fe_{76}Co_2$ of a thickness of 400 Å. A line 11 indicates the case without intermediate layer; a line 12 indicates the case with a silicon intermediate layer of a thickness of 30 Å, and a line 13 indicates the case with a silicon intermediate layer of 50 Å. As shown by the line 11, the exchange force usually decreases monotonously to reach zero at the Curie temperature of the first magnetic layer, which is about 145° C. in this case. The temperature-dependent change of the exchange force is approximately equal to that of magnetization of the first magnetic layer.

As shown in FIG. 5, the conventional two-layer film with vertical magnetic anisotropy shows lower exchange force when rising up the temperature, and this property is in contrast to that of the present invention.

Now the present invention will be clarified in greater detail, by examples, reference examples and comparative reference examples.

REFERENCE EXAMPLE 1 AND COMPARATIVE REFERENCE EXAMPLES 1, 2

A magnetic layer exhibiting in-plane magnetic anisotropy but decreasing the in-plane magnetic anisotropy and increasing the vertical magnetic anisotropy when heated, as in the second magnetic layer of the present invention, can be prepared by the control of composition, as shown in the following reference example 1.

On a slide glass, $Tb_{18}Fe_{80}Co_2$ was deposited by sputtering with a thickness of 500 Å as the first magnetic layer, and a GdDyFeCoTi film was deposited by sputtering as the second magnetic layer, with a thickness of 500 Å and with three compositions shown in Tab. 1. Finally $Si_3N_4$ film was formed with a thickness of 500 Å as the protective film.

TABLE 1

|  | Second magnetic layer | Long. Mag. Anisotropy | Vert. Mag. Anisotropy |
|---|---|---|---|
| Ref. Ex.1 | $(Gd_{75}Dy_{25})_{25}(Fy_{70}Co_{30})_{60}Ti_{15}$ | + | + |
| Comp. Ref. Ex.1 | $(Cd_{75}Dy_{25})_{21}(Fe_{70}Co_{30})_{64}Ti_{15}$ | − | + |
| Comp. Ref. Ex.2 | $(Gd_{75}Dy_{25})_{33}(Fe_{70}Co_{30})_{52}Ti_{15}$ | + | − |

In the columns of the in-plane or vertical magnetic anisotropy, a sign "−" indicates the absence of saturated orientation of the magnetization under the application of a magnetic field of 5 kOe in the corresponding direction, and a sign "+" indicates the presence of orientation.

More specifically, the Reference Example 1 had the coercive force of about 300 Oe in a direction perpendicular to the plane of the substrate, and the magnetization along the plane of the substrate saturated by the application of a magnetic field of about 2 kOe.

In the Comparative Reference Example 1, the second magnetic layer showed a coercive force of about 1.5 kOe in the vertical direction.

In the Comparative Reference Example 2, the second magnetic layer showed a coercive force of about 500 Oe in the in-plane direction of the substrate. In these reference example and comparative reference examples, the second magnetic layer had a sub lattice magnetization dominated by Gd and Dy, while the first magnetic layer had a coercive force of 12 kOe and a sub lattice magnetization dominated by Fe and Co.

The exchange force was measured on each sample with a VSM (vibrated sample magnetometer) in the following manner.

At room temperature, a vertical bias magnetic field of about 20 kOe was applied to each sample, thereby orienting the second magnetic layer in the unstable direction with respect to the first magnetic layer. Then the applied magnetic field was gradually decreased until the magnetization of the second magnetic layer was inverted to a stable (antiparallel) direction with respect to the first magnetic layer by means of the exchange force, and the exchange force acting on the second magnetic layer was determined from the coercive force of the second magnetic layer and the applied magnetic field at said inversion.

According to said measurement, the exchange force acting on the second magnetic layer was 50–100 Oe in the Reference Example 1, 2 kOe in the Comparative Reference Example 1, and approximately zero in the Comparative Reference Example 2.

Figure 6:
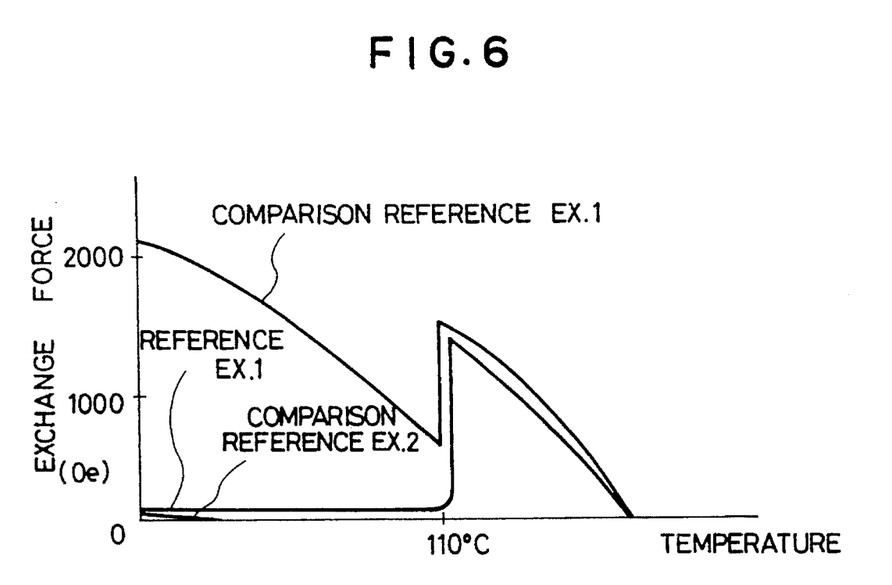
FIG. 6 is a chart showing temperature dependence of the exchange force in an embodiment of the present invention and in reference examples.

Then the exchange force was measured in a similar manner on each sample, while it was heated close to the Curie temperature $T_L$ of the first magnetic layer, and the obtained results are shown in FIG. 6. In a temperature range from room temperature to ca. 110° C. measured was the exchange force on the second magnetic layer, and in a range above 110° C. measured was the exchange force on the first magnetic layer.

As will be evident from FIG. 6, the Reference Example 1 satisfies the requirements for the recording medium of the present invention. The medium of the Reference Example 1 can be employed in the recording method of the present invention, with a recording bias magnetic field exceeding the coercive force plus exchange force at room temperature (300+100=400 Oe).

On the other hand, the medium of the Comparative Reference Example 1 requires a very high bias magnetic field exceeding the coercive force plus exchange force at room temperature (1.5 kOe+2.0 kOe=3.5 kOe). Even if such bias magnetic field is applied, satisfactory recording cannot be achieved due to increase recording noise.

The medium of the Comparative Reference Example 2 cannot be employed in the recording method of the present invention, due to the lack of the exchange force.

EXAMPLE 1

A pregrooved and preformatted disk-shaped polycarbonate substrate was set in a sputtering chamber equipped with four targets, with a distance of 10 cm to said target. Said substrate was rotated at 35 rpm, and $Si_3N_4$ was sputtered from a first target in argon atmosphere with a sputtering rate of 100 Å/min. and a sputtering pressure of $5 \times 10^{-3}$ Torr to form a $Si_3N_4$ protective layer of a thickness of 500 Å.

Then a TbFeCo alloy was sputtered from a second target in argon atmosphere with a sputtering rate of 100 Å/min. and a sputtering pressure of $5 \times 10^{-3}$ Torr to form a $Tb_{19}Fe_{72}Co_9$ layer (first magnetic layer), with a thickness of 500 Å, Curie temperature of ca. 180° C. and a coercive force of ca. 10 kOe, and with a sub lattice magnetization predominated by Fe and Co atoms.

Then Gd and FeCo were co-sputtered from third and fourth targets in argon atmosphere with a sputtering rate of 100 Å/min. and a sputtering pressure of $5 \times 10^{-3}$ Torr to form a $Gd_{28}Fe_{49}Co_{23}$ alloy film (second magnetic layer) with a thickness of 300 Å, Curie temperature of 220° C., compensation temperature of 150° C., and a coercive force of ca. 300 Oe in the vertical direction to the plane of the substrate. The external magnetic field required for orienting the second magnetic layer, at room temperature, in the in-plane direction along the plane of the substrate was about 1000 Oe, and the exchange force acting on the second magnetic layer at room temperature was 100 Oe in the measurements.

Subsequently a $Si_3N_4$ film of a thickness of 700 Å as a protective layer was formed by sputtering from the first target, in argon atmosphere, with a sputtering rate of 100 Å/min. and a sputtering pressure of $5 \times 10^{-3}$ Torr. Then a polycarbonate substrate was adhered with hot-melt adhesive onto said protective layer, thereby completing a disk-shaped magneto-optical recording medium of the present invention.

Said magneto-optical recording medium was set on a record/reproducing apparatus as shown in FIG. 3, and subjected to a recording operation with a laser beam of a wavelength of 830 nm condensed into a spot with a diameter of about 1 μm, modulated in two power levels of 4 and 8 mW with a duty ratio of 50% and a frequency of 2 MHz. The recording bias magnetic field was 450 Oe.

Then binary signals could be reproduced with a laser beam irradiation of 1.5 mW.

Also the magneto-optical recording medium, after similar signal recording with a frequency of 1 MHz over the entire surface, was subjected to similar signal recording of 2 MHz over the entire surface. The component of 1 MHz was not detected upon reproducing the magneto-optical recording medium and it was confirmed that the overwriting operation had been satisfactorily effected.

In the present example, the appropriate bias magnetic field is 450 Oe as explained above. A bias magnetic field as high as 600 Oe leads to increased noises though binary recording is possible. A bias magnetic field as low as 350 Oe is still capable of recording with the first laser power, but gives rise to increased bit errors due to a low sensitivity. Also a bias magnetic field as low as 250 Oe becomes incapable of the recording with the first laser power, because the orientation of magnetization of the second magnetic layer becomes unstable.

EXAMPLE 2

A recording medium was prepared in the same manner as in the Example 1, except that the second magnetic layer had a thickness of 500 Å. This medium was capable of overwriting as in the Example 1, with an optimum recording bias field of 350 Oe.

EXAMPLES 3–5

Recording media were prepared in the same manner as in the Example 1, except that the second magnetic layer was composed of $Tb_{20}Fe_{50}Co_{15}Ti_{15}$ with thicknesses shown in Tab. 2. These media were capable of overwriting as in the Example 1.

In the Example 3, the optimum range of the recording bias magnetic field was 350–450 Oe. A bias magnetic field as high as about 600 Oe gave rise to increased noises though binary recording was possible, and a magnetic field as low as 300 Oe leads to increased bit errors in the recording with the first laser power.

In the Example 4, the optimum range of the recording bias magnetic field was 300–350 Oe. A bias magnetic field as low as 250 Oe leads to increased bit errors in the recording with the first laser power.

In the Example 5, the optimum range of the recording bias magnetic field was 250–300 Oe. A bias magnetic field as low as 200 Oe leads to increased bit errors in the recording with the first laser power.

TABLE 2

| | Material | Thickness | Coercive force | Exchange force | Comp. temp. | Curie temp | Magnetic Field for orienting in-plane magnetization | Recording bias magnetic field |
|---|---|---|---|---|---|---|---|---|
| Ex. 1 | $Gd_{28}Fe_{49}Co_{23}$ | 300 Å | 300 Oe | 75 Oe | 150° C. | 220° C. | 1000 Oe | 450 Oe |
| Ex. 2 | " | 500 Å | 300 Oe | 400 Oe | 150° C. | 220° C. | 700 Oe | 350 Oe |
| Ex. 3 | $Tb_{20}Fe_{50}Co_{15}Ti_{15}$ | 200 Å | 250 Oe | 120 Oe | 185° C. | 210° C. | 1000 Oe | 350–450 Oe |
| Ex. 4 | " | 300 Å | 250 Oe | 80 Oe | 185° C. | 210° C. | 500 Oe | 300–350 Oe |
| Ex. 5 | " | 500 Å | 250 Oe | 50 Oe | 185° C. | 210° C. | 400 Oe | 250–300 Oe |

EXAMPLE 6

A magneto-optical recording medium was prepared in the same manner as in the Example 1, except that the second magnetic layer was composed of $Gd_{14}Dy_{10}Fe_{68}Co_8$ with a thickness of 2000 Å. This medium was capable of overwriting.

The optimum range of the recording bias field was 400–500 Oe. A field as low as 300 Oe was incapable of recording with the first laser power.

COMPARATIVE EXAMPLE 1

A recording medium was prepared in the same manner as in the Example 6, except that the thickness of the second magnetic layer was 300 Å. Said medium showed a very small in-plane magnetic anisotropy, requiring a magnetic field to be applied as high as 7 kOe for orienting the magnetization in the plane direction.

Said medium was subjected to the recording operation as in the Example 6. However, a bias magnetic field of 400 Oe was incapable of the first recording, and a bias field of 600 Oe resulted in increased recording noise though the recording was possible.

The comparison of the Example 6 and the Comparative Example 1 confirmed that an increase in the thickness of the second magnetic layer, even when the in-plane magnetic anisotropy thereof is somewhat small, reduces the exchange force at room temperature, thereby enabling the recording of the present invention with a recording bias magnetic field of 400–500 Oe. However, such increase in the film thickness is undesirable in terms of recording density, for a given output of the laser.

Nevertheless the medium of said comparative Example 1 is included in the present invention, and can be used in recording, by means of a recording mode to be shown in Examples 11 and 12 hereafter.

COMPARATIVE EXAMPLES 2, 3

Magneto-optical recording media were prepared in the same manner as in the Example 1, except that the second magnetic layer was composed of $Gd_{24}Fe_{76}$ with thicknesses shown in Tab. 3. The second magnetic layers of these recording media exhibited strong vertical magnetization, not showing saturated magnetization orientation in the in-plane direction even under an applied field of 10 kOe.

These media were subjected to the recording operation as explained in the foregoing. In the Comparative Example 2, a bias magnetic field 500 Oe was incapable of the first recording, while a bias field of 800 Oe resulted in increased recording noise. In the Comparative Example 3, a bias magnetic field of 400 Oe was incapable of the first recording, while a bias field of 400 Oe resulted in increased recording noise though the recording was possible.

EXAMPLES 7–10 AND COMPARATIVE EXAMPLES 4, 5

Recording media were prepared in the same manner as in the Example 1, except that the second magnetic layer was formed with periodic films of rare earth elements and transition metals by reducing the revolution of the substrate at film formation, with materials and periodical structures shown in Tab. 4.

Examples 7 and 8 provided satisfactory recording with a bias magnetic field of 500 Oe, but the Comparative Example 4 was incapable of the first recording with a bias magnetic field of 500 Oe.

Examples 9 and 10 provided satisfactory recording with a bias field of 400 Oe, but the Comparative Example 5 was incapable of the first recording with a bias field of 400 Oe.

The cycle of the periodic structure indicates the summed thickness of a pair of the layers of the rare earth metal and of the transition metal in the second magnetic layer. Comparison of the Examples 7 and 8, or 9 and 10 indicates that a larger structural cycle obtained by a lower revolution of the substrate at the formation of the second magnetic layer provides a stronger in-plane magnetic anisotropy at room temperature, thereby reducing the exchange force on the second magnetic layer and achieving better recording of the present invention.

TABLE 3

| | Material | Thickness | Coercive force | Exchange force | Comp. temp. | Curie temp | Magnetic field for orienting in-plane magnetization | Recording bias magnetic field |
|---|---|---|---|---|---|---|---|---|
| Example 6 | $Gd_{14}Dy_{10}Fe_{68}Co_8$ | 2000 Å | 250 Oe | 100 Oe | 180° C. | 210° C. | 3 kOe | 400–500 Oe |

TABLE 3-continued

| | | Second magnetic layer | | | | | | |
|---|---|---|---|---|---|---|---|---|
| | Material | Thickness | Coercive force | Exchange force | Comp. temp. | Curie temp | Magnetic field for orienting in-plane magnetization | Recording bias magnetic field |
| Comp. Ex. 1 | " | 500 Å | 250 Oe | 300 Oe | 180° C. | 210° C. | 7 kOe | — |
| Comp. Ex. 2 | $Gd_{24}Fe_{76}$ | 500 Å | 300 Oe | 700 Oe | 130° C. | 220° C. | $\geq$10 kOe | — |
| Comp. Ex. 3 | " | 2000 Å | 300 Oe | 150 Oe | 130° C. | 220° C. | $\geq$10 kOe | — |

TABLE 4

| | | | Second magnetic layer | | | | | | |
|---|---|---|---|---|---|---|---|---|---|
| | Structural cycle | Material | Thickness | Coercive force | Exchange force | Comp. temp. | Curie temp. | Magnetic field for orienting in-plane magnetization | Recording bias magnetic field |
| Ex. 7 | 10 Å | $Gd_{24}Fe_{76}$ | 500 Å | 250 Oe | 100 Oe | 140° C. | 200° C. | 1.5 kOe | 500 Oe |
| Ex. 8 | 30 Å | " | 500 Å | 200 Oe | 50 Oe | 140° C. | 170° C. | 100 Oe | 500 Oe |
| Comp. Ex. 4 | 2.86 Å | " | 500 Å | 300 Oe | 700 Oe | 130° C. | 220° C. | $\geq$10 kOe | — |
| Ex. 9 | 8 Å | $Gd_{14}Dy_{10}Fe_{68}Co_8$ | 500 Å | 220 Oe | 100 Oe | 180° C. | 200° C. | 1 kOe | 400 Oe |
| Ex. 10 | 20 Å | " | 500 Å | 210 Oe | 50 Oe | 180° C. | 200° C. | 500 Oe | 400 Oe |
| Comp. Ex. 5 | 2.86 Å | " | 500 Å | 250 Oe | 300 Oe | 180° C. | 210° C. | 7 kOe | — |

EXAMPLE 11

A recording medium was prepared in the same manner as in the Example 1, except that the second magnetic layer was composed of $Gd_{22}Fe_{78}$ with a thickness of 500 Å, as shown in Tab. 5.

TABLE 5

| | | Second magnetic layer | | | | | | |
|---|---|---|---|---|---|---|---|---|
| | Material | Thickness | Coercive force | Exchange force | Comp. temp. | Curie temp | Magnetic Field for orienting in-plane magnetization | Recording bias magnetic field |
| Example 11 | $Gd_{22}Fe_{78}$ | 500 Å | 700 Oe | 500 Oe | 120° C. | 220° C. | 1.2 kOe | 200 Oe |
| Example 12 | $Gd_{14}Tb_{10}Fe_{73}CO_3$ | 800 Å | 1200 Oe | 500 Oe | 150° C. | 190° C. | 700 Oe | 150–300 Oe |

Said recording medium was subjected to a recording operation with a recording bias magnetic field of 200 or 700 Oe, but was incapable of the first recording.

However satisfactory recording was possible with a recording bias magnetic field of 200 Oe, by giving another magnetic field of 2 kOe of the same direction on the same track of the medium, in a position separate from the head.

EXAMPLE 12

A recording medium was prepared in the same manner as in the Example 1, except that the second magnetic layer was composed of $Gd_{14}Tb_{10}Fe_{73}Co_3$ with a thickness of 800 Å, as shown in Tab. 5.

Said recording medium was subjected to a recording operation with a recording bias magnetic field of 300 or 1000 Oe, but was incapable of the first recording.

However satisfactory recording was possible with a recording bias magnetic field of 150 or 300 Oe, by giving another magnetic field of 2 kOe of the same direction on the same track of the medium, in a position separate from the head.

Figure 7:
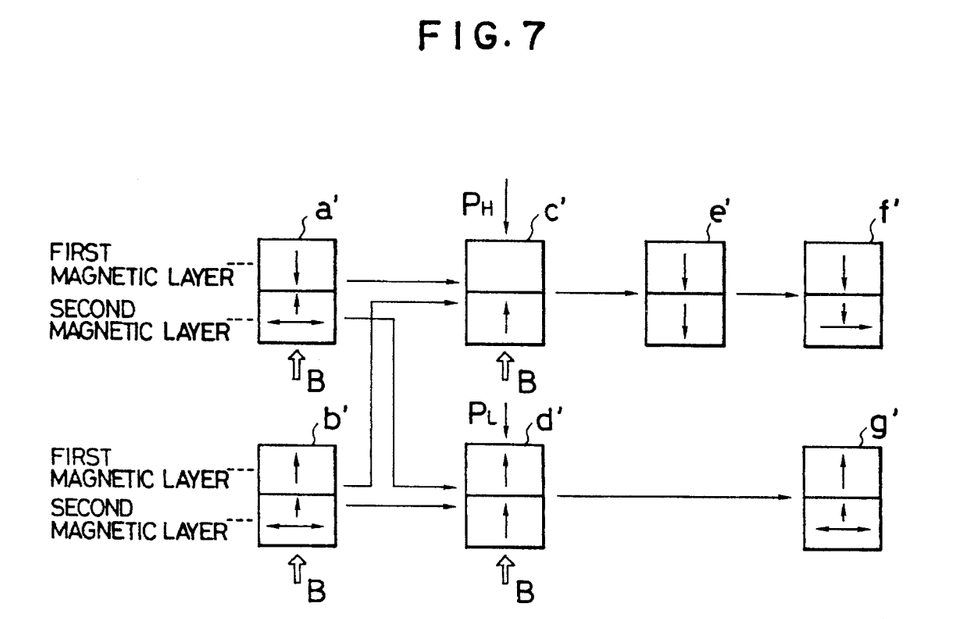
FIG. 7 is a schematic view of another embodiment of the recording method of the present invention.

In the foregoing embodiments, the media are stable when the directions of magnetization of the first and second magnetic layers are anti-parallel, but the present invention is likewise applicable to a recording medium which is stable when the directions of said magnetizations are mutually parallel, namely in which the exchange force serves to orient the magnetizations in a same direction. FIG. 7 schematically shows the recording mode when such recording medium is employed. States a'–g' in FIG. 7 respectively correspond to the states a–g in FIG. 4, and the operations in FIG. 7 are same as those in FIG. 4, so that detailed explanation will be omitted.

In addition to the foregoing examples, the present invention is subject to various modifications. For example, there may be employed a second magnetic layer having no compensation temperature between room temperature and the Curie temperature. In such case, in the so-called initializing step for orienting the magnetization of the second magnetic layer in a direction prior to the irradiation of the laser beam, it becomes necessary to apply a magnetic field in a direction opposite to the recording bias magnetic field to be applied upon irradiating the laser beam. Consequently, in such case, there is provided means for applying an initializing magnetic field, separate from the means for applying the recording bias field, in a separate position from the record/reproducing head.

The present invention includes all such modifications within the scope and spirit of the appended claims.

What is claimed is:

1. A magneto-optical recording medium comprising:

an optically transparent substrate and exactly two magnetic layers, said two layers being a first magnetic layer and a second magnetic layer, said first magnetic layer being placed on said substrate and exhibiting vertical magnetic anisotropy; and said second magnetic layer being placed on said first magnetic layer, said second magnetic layer satisfying the following conditions (a) through (f):

(a) said second magnetic layer having a higher Curie temperature and a lower coercive force at room temperature than the Curie temperature and coercive force at room temperature of said first magnetic layer;

(b) said second magnetic layer being exchange-coupled with said first magnetic layer;

(c) said second magnetic layer having both in-plane magnetic anisotropy and vertical magnetic anisotropy at room temperature;

(d) the coercive force of said second magnetic layer in the vertical direction not being zero at room temperature and said second magnetic layer maintaining the vertical anisotropy component at room temperature;

(e) the vertical magnetic anisotropy relative to the in-plane magnetic anisotropy of said second magnetic layer being larger at a temperature at about the Curie temperature of said first magnetic layer than at room temperature; and (f) said second magnetic layer having a compensation temperature between room temperature and the Curie temperature of said second magnetic layer.

2. A magneto-optical recording medium according to claim 1, wherein said first and second magnetic layers comprise alloys of rare earth metals and transition metals.

3. A magneto-optical recording medium according to claim 2, wherein said first and second magnetic layers comprise alloys selected from the group consisting of GdCo, GeFe, TbFe, DyFe, GdTbFe, TbDyFe, GdDyFe, GdTbFeCo, TbFeCo, GdTbCo, GdDyFeCo and HoGdFeCo.

4. A magneto-optical recording medium according to claim 2, wherein transition metal sublattice magnetization predominates in said first magnetic layer and rare earth element sublattice magnetization predominates in said second magnetic layer.

5. A magneto-optical recording medium according to claim 1, wherein said second magnetic layer comprises laminated alternating thin films of a rare earth element and a transition metal.

6. A magneto-optical recording medium according to claim 1, wherein said first magnetic layer has a coercive force in a range from 3 to 20 kOe.

7. A magneto-optical recording medium according to claim 6, wherein said first magnetic layer has a coercive force in a range from 7 to 20 kOe.

8. A magneto-optical recording medium according to claim 1, wherein said second magnetic layer has a coercive force not exceeding 1000 Oe at room temperature.

9. A magneto-optical recording medium according to claim 8, wherein said second magnetic layer has a coercive force not exceeding 500 Oe at room temperature.

10. A magneto-optical recording medium according to claim 1, wherein said first magnetic layer has a thickness in a range from 100 to 1000 Å.

11. A magneto-optical recording medium according to claim 10, wherein said first magnetic layer has a thickness in a range from 200 to 500 Å.

12. A magneto-optical recording medium according to claim 1, wherein said second magnetic layer has a thickness in a range from 300 to 3000 Å.

13. A magneto-optical recording medium according to claim 12, wherein said second magnetic layer has a thickness in a range from 500 to 1500 Å.

14. A magneto-optical recording medium according to claim 1, further comprising a first protective layer provided between said substrate and said first magnetic layer, and a further second protective layer placed on said second magnetic layer.

15. A magneto-optical recording medium according to claim 1, further comprising an adhesive layer and a second substrate, wherein said second substrate is adhered with said adhesive layer so as to position said first and second magnetic layers between said substrate and said second substrate.

16. A method for recording information on a magneto-optical recording medium comprising:

a transparent substrate and exactly two magnetic layers, said two magnetic layers being a first magnetic layer and a second magnetic layer, said first magnetic layer being placed on said substrate and exhibiting vertical magnetic anisotropy; and said second magnetic layer being placed on said first magnetic layer, said second magnetic layer satisfying the following conditions (a) through (f):

(a) said second magnetic layer having a higher Curie temperature and a lower coercive force at room temperature than the Curie temperature and coercive force at room temperature of said first magnetic layer;

(b) said second magnetic layer being exchange-coupled with said first magnetic layer;

(c) said second magnetic layer having both in-plane magnetic anisotropy and vertical magnetic anisotropy at room temperature;

(d) the coercive force of said second magnetic layer in the vertical direction not being zero at room temperature and said second magnetic layer maintaining the vertical anisotropy component at room temperature;

(e) the vertical magnetic anisotropy relative to the in-plane magnetic anisotropy of said second magnetic layer being larger at a temperature close to a Curie temperature of said first magnetic layer than at room temperature; and (f) said second magnetic layer having a compensation temperature between room temperature and the Curie temperature of said second magnetic layer, said recording method comprising the steps of:

causing the vertical magnetization of said second magnetic layer to be oriented in a vertical direction by vertically applying a magnetic field of a level which does not invert the magnetization of said first magnetic layer; and while applying a magnetic field in the vertical direction, effecting according to an information signal either:

(i) a first method of recording by irradiating the recording medium with a light beam of a power which is sufficient to heat such recording medium up to a temperature at about the Curie temperature of the first magnetic layer to magnetize the first magnetic layer in a direction stable with respect to the second magnetic layer but not vary the direction of magnetization of the second magnetic layer, or (ii) a second method of recording by irradiating the recording medium with a light beam of a power which is sufficient to heat said recording medium up to a temperature at about the Curie temperature of the second magnetic layer to invert the direction of magnetization of the second magnetic layer and then magnetize the first magnetic layer in a direction stable with respect to the magnetization of the second magnetic layer.

17. A recording method according to claim 16, wherein the magnetic field applied to said recording medium is in a range from 50 to 500 Oe.

* * * * *

UNITED STATES PATENT AND TRADEMARK OFFICE
CERTIFICATE OF CORRECTION

PATENT NO. : 5,503,924  
DATED : April 2, 1996  
INVENTOR(S) : YOICHI OSATO

Page 1 of 4

It is certified that error appears in the above-indentified patent and that said Letters Patent is hereby corrected as shown below:

COLUMN 1

Line 28, "magneto" should read --magneto- --.  
    Line 40, "applied" should read --is applied--.  
    Line 54, "exchange coupled." should read --exchange-coupled--.

COLUMN 2

Line 42, "structures" should read --structure--.

COLUMN 3

Line 28, "As" should read --(As--.  
    Line 36, "below. The" should read --below). ¶The--.  
    Line 38, "selected" should read --selected so--.  
    Line 39, "dfrection" should read --direction--.  
    Line 42, "selected" should read --selected so--.  
    Line 48, "Oe,)" should read --Oe),--.  
    Line 51, "$T_H$" should read --$T_H$,--.

UNITED STATES PATENT AND TRADEMARK OFFICE
CERTIFICATE OF CORRECTION

PATENT NO. : 5,503,924
DATED : April 2, 1996
INVENTOR(S) : YOICHI OSATO

It is certified that error appears in the above-indentified patent and that said Letters Patent is hereby corrected as shown below:

COLUMN 4

Line 18, "laminated)" should read --laminated),--.
Line 29, "to substrate 1" should be deleted.
Line 33, "substrate 7." should read --substrate 7 to substrate 1.--.
Line 41, "said" should be deleted.

COLUMN 5

Line 18, "by" should read --in--.
Line 19, "in" should read --by--.
Line 52, "$T_{comp}$" should read --$T_{comp}$,--.

COLUMN 6

Line 55, "magnitization" should read --magnetization--.

COLUMN 7

Line 7, "layers" should read --layers,--.
Line 31, "Tb" should read --Tb,--.
Line 59, "monotonously" should read --monotonically--.

UNITED STATES PATENT AND TRADEMARK OFFICE
CERTIFICATE OF CORRECTION

PATENT NO. : 5,503,924

DATED : April 2, 1996

INVENTOR(S) : YOICHI OSATO

It is certified that error appears in the above-indentified patent and that said Letters Patent is hereby corrected as shown below:

COLUMN 8

Line 26, "$(Cd_{75}$" should read --$(Gd_{75}$--.
Line 50, "sub lattice" should read --sublattice--.
Line 52, "sub lattice" should read --sublattice--.

COLUMN 9

Line 26, "increase" should read --increased--.
Line 44, "sub lattice" should read --sublattice--.

COLUMN 12

Line 21, "500 Oe" should read --of 500 Oe--.

UNITED STATES PATENT AND TRADEMARK OFFICE
CERTIFICATE OF CORRECTION

PATENT NO. : 5,503,924

DATED : April 2, 1996

INVENTOR(S) : YOICHI OSATO

It is certified that error appears in the above-indentified patent and that said Letters Patent is hereby corrected as shown below:

COLUMN 13

Line 66, "However" should read --However,--.

Signed and Sealed this

Third Day of September, 1996

*Attest:*

BRUCE LEHMAN

*Attesting Officer*     Commissioner of Patents and Trademarks